March 19, 1946.   B. G. HORSTMANN   2,396,951
COMBINED MANUAL AND AUTOMATIC CONTROL MEANS FOR AIRCRAFT
Filed Oct. 15, 1942   2 Sheets-Sheet 1
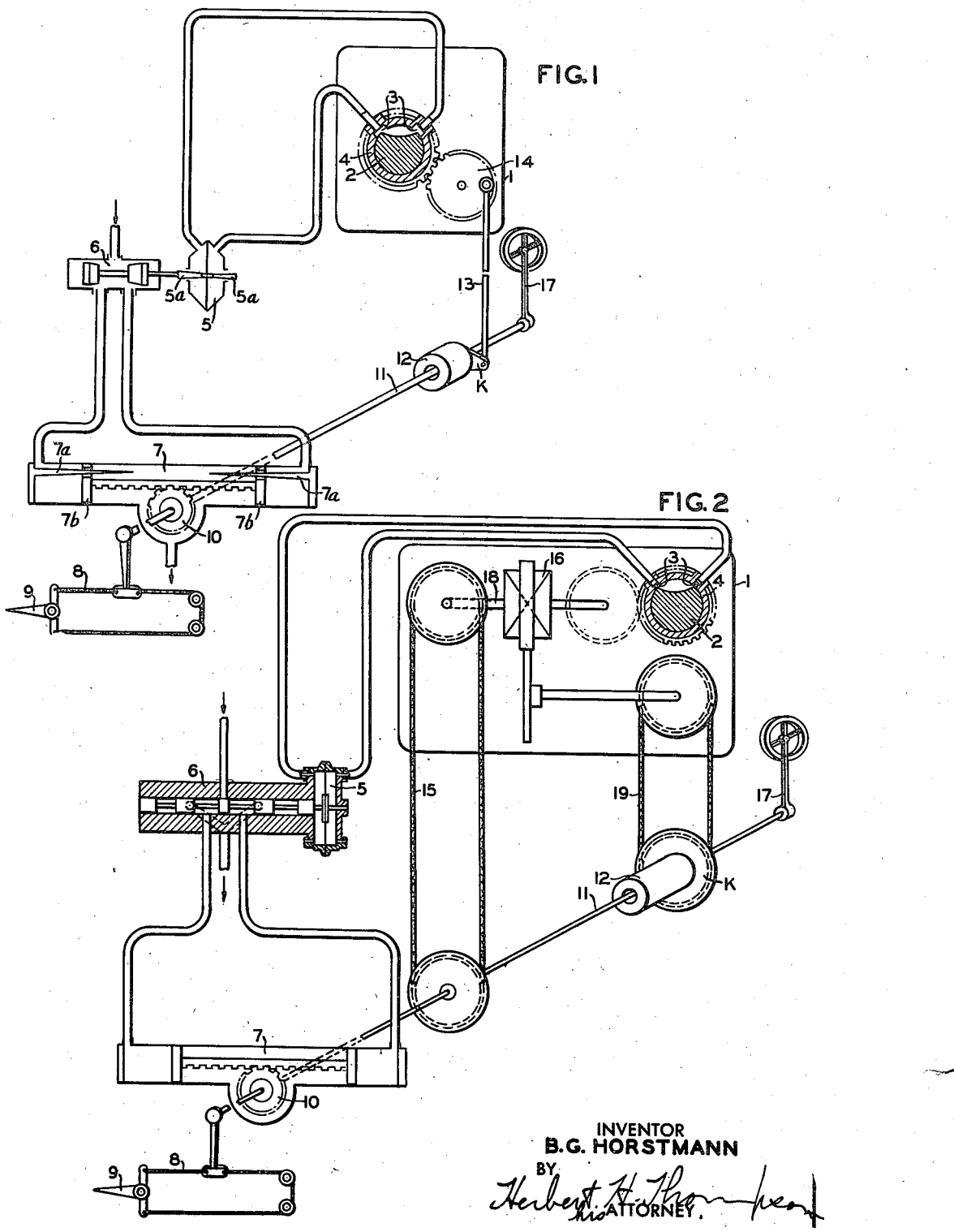
INVENTOR
B.G. HORSTMANN
BY
ATTORNEY.

March 19, 1946.  B. G. HORSTMANN  2,396,951
COMBINED MANUAL AND AUTOMATIC CONTROL MEANS FOR AIRCRAFT
Filed Oct. 15, 1942  2 Sheets-Sheet 2

INVENTOR
B. G. HORSTMANN
BY
Herbert H. Thompson
his ATTORNEY.

Patented Mar. 19, 1946

2,396,951

UNITED STATES PATENT OFFICE 2,396,951

COMBINED MANUAL AND AUTOMATIC CONTROL MEANS FOR AIRCRAFT

Bevan Graham Horstmann, Bath, England, assignor to The Sperry Gyroscope Company Limited, Brentford, Middlesex, England Application October 15, 1942, Serial No. 462,446
In Great Britain June 20, 1941

6 Claims. (Cl. 244—78)

This invention relates to aircraft in which combined manual and automatic control means are provided, so that whilst the aircraft can be controlled by the manual means at the will of the human pilot, automatic control means can be rendered operative which will maintain the aircraft in the flying attitude set by the human pilot.

This kind of combined manual and automatic control means is well known and comprises a controlling instrument (usually a gyroscope) for detecting angular deviation of the aircraft from the desired flying attitude about one of the aircraft's principal axes and for causing a servomotor to operate a control surface of the craft to apply the necessary corrective torque to the craft to restore it towards the correct attitude. The control action exerted by the primary controlling instrument is initiated by a primary controller, a member of which is directly actuated by the primary controlling instrument, and the control action is exerted in accordance with the relative position of the member and a second member co-operating with it, the second member being usually referred to as the pick-off member or pick-off. For example, in a well known automatic control system the primary controller is a valve device in a positive or negative air pressure system, in which a valve or shutter is directly actuated by the gyroscope and exercises control action in accordance with the position of the shutter relative to two ports in a pick-off member adjacent to, or forming a casing for, the shutter; normally the ports are so positioned relatively to the shutter that they are uncovered to equal extents, in which case the servo-motor is inoperative. If the aircraft undergoes a change of attitude, the pick-off member, being carried by it, is displaced relatively to the shutter, and one of the ports is covered to a greater extent by the shutter while the other is covered to a smaller extent. The air flow through the ports is thus unbalanced; the resulting difference of pressure in the two streams through the ports is used to actuate a servo-motor, the latter applying the necessary corrective movements to the control surfaces of the aircraft.

Whilst the invention is applicable to automatic control systems of the foregoing kind in general it will be mainly described with reference to those using air flow pick-offs operating at the primary controlling instrument as previously explained.

In the known automatic control systems the pick-off valve has to be pre-set by the pilot by means of various specially provided knobs, levers or equivalents to determine the desired attitude of the aircraft.

The phrase "attitude of the aircraft" is used herein in its widest sense to include angular position either in azimuth or in a vertical plane. Whilst the invention is more readily applicable to control of an elevator, it is nevertheless applicable to controlling bank as discussed in greater detail later in the specification.

The primary object of this invention is to eliminate the necessity of setting the pick-off member to the desired attitude by the separate manipulation of knobs or the like specially provided for this purpose and to provide an arrangement wherein the automatic control means are so combined with the manual control means that when the latter are operated for placing the aircraft into the desired attitude and the manual controls are released by the pilot the automatic control means becomes operative without any further action on the part of the pilot.

With this object in view, and according to the invention, in automatic flight control apparatus for aircraft of the kind set forth means are provided operable by the manual control of the aircraft to impart to the pick-off member defining the attitude of the aircraft a displacement corresponding to the displacement imparted to the manual control by the pilot. For this purpose a connection between the manual control and the pick-off member of the automatic control unit is provided. Such a connection may be mechanical, electrical, hydraulic or pneumatic.

The setting of the aircraft to a certain attitude and the setting of the automatic control means for maintaining that attitude are consequently effected simultaneously by the operation of the manual controls owing to the connection between the latter and the pick-off of the automatic control means. It follows that in the arrangement according to the invention the attitude setting knobs provided in previous automatic control means, and their connections with the pick-off elements, may be dispensed with, and all that is necessary for setting the automatic control means for maintaining the aircraft in any desired attitude is to operate the manual controls in the usual way for bringing the aircraft into that attitude. Once set, the automatic control means will take over control and maintain the aircraft in the set attitude as soon as the manual control means are released. Should the craft deviate from the attitude so that the relative position of the controlling instrument and its pick-off is altered the automatic control means is set into operation to restore the aircraft to the set attitude. Conversely, should it be required to change the set attitude of the aircraft, all the pilot has to do is to effect such alteration of the attitude of the aircraft by means of his manual controls (the control system being such that he can do so in spite of the fact that the automatic control means are simultaneously in operation) the automatic control means then assuming their operation with regard to the fresh attitude as before.

The arrangement of the said connecting means must be such that, although operation of the manual control means for altering the attitude of the aircraft effects simultaneously the setting of the automatic control means to that attitude, movements of the control surface due to external influences leaves the displacement imparted to the pick-off member defining the attitude of the aircraft to be maintained by the aircraft control means unaffected, merely rendering the automatic control system operative for restoring the aircraft to pre-set attitude. In other words, there is no "drive-back" from the control surface or servomotor to the pick off member or housing. Examples of mechanical connecting means answering this purpose are described in a latter part of this specification, and various mechanical, electrical, hydraulic and pneumatic connecting means or combinations of these various types of connecting means will readily suggest themselves to those skilled in the art.

The connecting means between the manual control means and the setting element of the automatic control means may be constructed and arranged in such a manner that the pick-off or setting element is moved by the manual control to a certain extent before the control surface is moved, i. e., "lost motion" is provided in the connection between the manual control means and the control surface. The result of this provision is that the automatic control means begin to operate the control surfaces in the same manner as the pilot when the latter is about to set them manually, and therefore assists the pilot through the servomotor in completing the setting of the aircraft to the required new attitude. Thus, in the case of aircraft of large dimensions, the manual control of which requires considerable muscular power, as soon as the pilot begins to move the manual control element in a certain direction the servo-motor becomes operative and imparts movement to the control surfaces in the same sense, thereby assisting the pilot, who can then complete the manual setting of the attitude of the aircraft with less effort.

The system may, however, include a servomotor and control valve therefor wherein the servo piston is adapted to yield slightly to forces applied from the manual control. This, in itself, would enable the pilot to actuate both the control surface and the means for imparting displacement to the pick-off member, and the displacement of the pick-off member would then result in servo aid for the pilot.

The invention will be more readily understood by reference to the accompanying drawings, wherein:

Figures 1 and 2 are diagrams showing control systems for an aircraft including an automatic control apparatus with an air pick-off system and a manual controller element coupled thereto in accordance with the invention;

Figure 3:
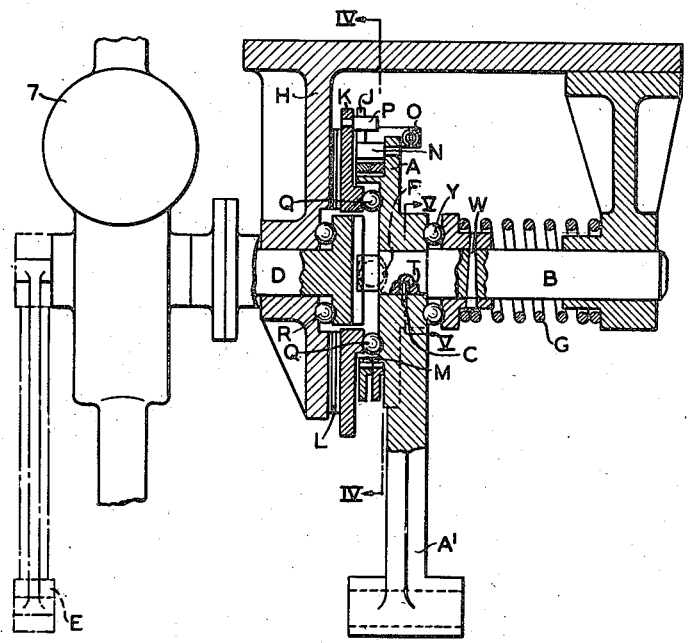
Figure 3 shows in longitudinal section a form of mechanism for coupling the manual controller to the automatic control apparatus.

Referring to Figure 1, the numeral 1 designates the outer casing of the gyroscope which is maintained at subatmospheric pressure by means not shown in order that air may be drawn in and directed to spin the gyroscope. A cut-off disc 2 is gyroscopically positioned to control the openings of the air pick-off ports 3 in the member 4; the ports move with the casing 1 in relation to the disc 2 according to the position of the aircraft and additionally the ports 3 are adjustable in relation to the casing 1 by movement of the member 4. An air relay 5 moves the balanced oil valve 6 when the areas of the openings of the respective pick-off ports 3 are unequal, causing deflection of the diaphragm of the relay. The valve 6 permits oil to flow to one side of the servo unit 7, the piston of which is suitably connected to operate a control cable 8 for the control surface 9. For convenience of illustration a rack-and-pinion connection 10 is depicted but this is only one example of various operative connections which may be adopted.

The arrangement depicted in Figure 1 is that of a proportionally acting type (or progressive control type) of automatic control. That is to say the difference of pressure produced at the pick-off ports 3 varies progressively with the extent of the displacement of the pick-off member 4 relative to the cut-off disc 2 throughout the range of normal movement of the aircraft, and the movement of the diaphragm in the air relay 5 varies progressively with the magnitude of this difference of pressure. Similarly the difference of pressure in the pipes leading from the relay valve 6 to the servo-motor 7 varies progressively with the extent of the displacement of the relay valve produced by the diaphragm, and the resultant movement of the servo-motor varies progressively with the magnitude of this difference of pressure. In the system of Figure 1 this result is attained firstly by employing ports 3 having a sufficient circumferential opening; secondly by providing valves 5a operated by movement of the diaphragm which modify the air-flow producing the pressure difference effect in the air relay 5; thirdly by arranging that the ports in the relay valve leading to the servo-motor are never completely shut during normal working conditions; and fourthly by providing needle valves 7a operated by movement of the servo-motor which modify the flow of pressure fluid to the two sides of the servo piston, the fluid escaping through the needle valves 7a to exhaust.

In the illustrated example assuming a negative-pressure system, the needle valves 5a are so arranged with reference to their co-operating ports that on the side on which the suction has been increased by the action of the pick-off valve, a reduction of suction is obtained by the action of the needle valve, whereas on the other side, where the suction has been decreased by the action of the pick-off valve, an increased suction is obtained as a result of the operation of the needle valve. Thus, the effect of the suction applied to one side of the diaphragm as a result of the deflection of the aircraft is counteracted by a reducing tendency due to the action of the needle valve, the opposite effect being produced simultaneously on the other side of the diaphragm, so that the latter will move with extreme smoothness through a distance proportional to the deflection of the aircraft with reference to the gyroscope. Manifestly, the exact result desired can be obtained by correct calibration of the taper and length of the needle valves 5a and their relative positions with reference to their ports. It will be seen that owing to the restricted and proportional movement of the diaphragm of the air relay 5 the balanced oil valve 6 will also perform proportional movement and will thus allow only proportional oil pressure to be exerted on one side of the piston of the servo-motor 7.

The means for ensuring proportional movement of the piston of the servo-motor 7 also consist of needle valves (7a) governing the escape of fluid from the ends of the servo-motor cylinder. The valves 7a are secured to the cylinder and co-operate with ports in the piston, the latter being conveniently constructed in the form of two end discs 7b connected by a central rod, which in the example shown is the rack of the rack-and-pinion gear 10, there being one port in each end disc and each port co-operating with one of the needle valves 7a. The needle valves are so arranged that an increase of oil pressure on one side tending to move the piston in one direction is counteracted by the closing of the corresponding needle valve port. Thus, equilibrium of the piston will be established as soon as same has moved a distance proportional to and adequate for correcting the deflection of the aircraft from its set attitude. The proportional control system described immediately above thus provides a self-damping system which limits the movements imparted to the control surfaces or serves as a substitute for the conventional "repeat-back" mechanism.

The means for ensuring proportionality have been described in conjunction with a system wherein negative pressure is produced in the air relay as is the usual practice in aircraft control, but it will be appreciated that the proportional means according to the invention will operate if the system is arranged for positive pressure in the air relay, namely when air is blown through same instead of being sucked through it. In this case the pressure conditions described will be reversed and to produce such reverse pressure conditions the needle valves, as regards their tapers, will also have to be reversed with reference to their ports and the diaphragm.

Figure 2 shows the invention applied to a case where means are provided by which the servo-motor 7 exerts a follow-back action serving to actuate the pick-off device and restore it, when the servo-motor operates, towards its neutral condition in which it ceases to energise the servo-motor to cause further movement.

In Figure 2, as in Figure 1, a rack-and-pinion connection 10 is employed between the servo-motor 7 and the control surface 9. The follow-back connection is then conveniently effected by a cable 15 carried on the shaft 11 actuated by the pinion of the rack-and-pinion connection 10, this cable serving to operate the follow-up shaft 18, which is connected to actuate the pick-off member 4 through a differential 16.

In Figure 2, the reference numerals already used in Figure 1 apply when the parts are the same or correspond. In particular, the cut-off disc 2 is gyroscopically positioned to control the openings of the air pick-off ports 3 in the member 4, these ports being of the on-off type, i. e. having a very short circumferential opening bringing about a sharp cut-off or opening. The ports 3 move with the member 4 which is under the influence of aircraft movements relative to the space-fixed disc 2. The element 4 is in this case, however, also caused to follow the disc 2 by means of a follow-up system including the cable 15 worked from the servo-motor 7. For the rest, as in the previous example, when the areas of the openings of the respective pick-off ports 3 are unequal, the air relay 5 moves the relay valve 6, operating the servo 7 and thus the control surface 9, but, as distinct from the construction of Figure 1, the relay valve 6 controls the inlet of pressure fluid to one end of the servo-motor and simultaneously controls the outlet of pressure fluid from the other end of the servo-motor.

In both cases (Figures 1 and 2) the manual controller is represented by the stick 17 which operates the cable 8 and control surface 9 through means represented diagrammatically by the rotatable shaft 11.

According to the system of Figure 1 it is fairly easy to take over-riding manual control because in the position of equilibrium of the automatic control system the inlet ports in the relay valve 6 admitting oil to both sides of the servo-motor are partly open. If the pilot applies force to the manual control column, he can therefore displace the servo piston which yields without much difficulty. The pilot can therefore actuate both the control surface and the pick-off member 4, and the displacement of the latter will natural result in servo aid for the pilot.

In the system of Figure 2 means (not shown) will be provided for permitting the pilot to actuate manually the control surface 9 in spite of the fact that the servo-motor 7 is rigidly connected to it and would normally resist any attempt to displace the control surface 9 from the position defined for it by the pick-off of the gyroscope. One example of such a means is to be seen in Figure 2 of the prior British Patent No. 455,673 (Sperry) where there is seen a servo arrangement embodying, in addition to a main manually operable by-pass valve for short-circuiting the servo-motor when desired, a second short-circuiting valve normally closed but adapted to open on application of a greater manual force than usual to permit the control surface to be operated manually even when the automatic control means is in operation.

Alternatively, a device may be introduced, as described later, to afford the pilot assistance by the servo-motor when manually controlling the movements of the control surface.

In carrying out the invention according to Figure 1, movements initiated by the manual controller 17 are communicated directly to the member 4, and this is diagrammatically represented by the mechanism 12 attached to the shaft 11 and connected by the tie 13 through the gear 14 meshing with a gear on the member 4. It is to be understood, however, that the movement secured from the mechanism 12 can be applied to setting the automatic control in other ways. According to Figure 2 a differential 16 is interposed in the follow-back drive, and one part of the differential is operated from the mechanism 12. For example, the follow-up shaft or spindle 18 as seen in Figure 2, actuating the member 4, is divided and the two parts differentially connected as at 16. One part of the shaft receives the follow-back drive from the servo-motor through cable 15 and actuates the pick-off member 4 through the differential via the other part, whilst the latter can be moved via the differential by the element K through the cable 19 also to set the automatic control, but without moving the first part.

The mechanism 12 must be designed to enable the manual controller 17 to operate the surface 9 and the pick-off element 4, whilst any "drive back" from the control surface 9, e. g. as a result of actuation of the servo-motor by the automatic control system to correct a deviation of the craft, will affect only the manual control 17 and not the pick-off element, i. e. mechanism 12 constitutes a "one way" clutch.

Figure 4:
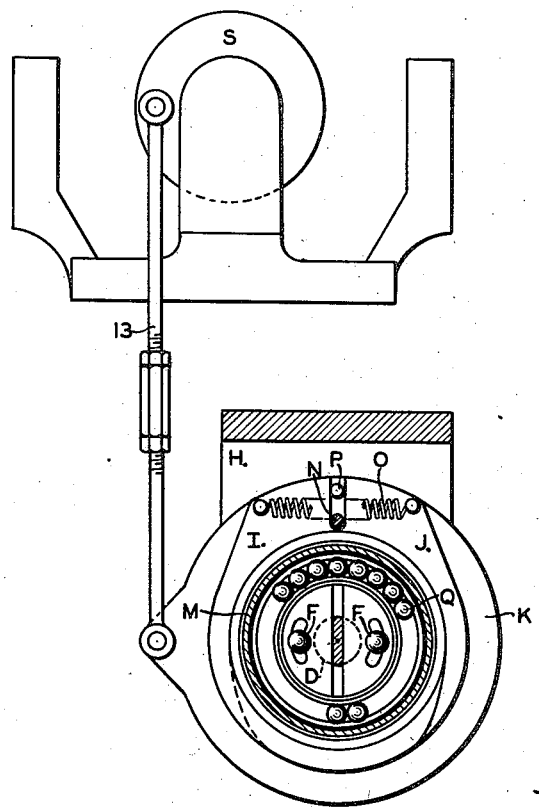
Figure 4 shows a transverse section on the plane IV—IV of Figure 3.

Reference is now directed to Figures 3 and 4 which illustrate a form of coupling mechanism 12 for effecting the above interworking drives.

A is a plate attached to the arm A', which may be the control column or a member operated by the control column, and B is a shaft on which plate A is mounted for limited oscillation. Co-axial with the first shaft B is a second shaft D which is directly connected with the servo-motor 7 and with the control surface, the connection with the latter being shown, for the sake of example, by the arm E. Between the ends of the two shafts or rather between the end of the second shaft D and the plate A there are included balls F in wedge-shaped pockets provided in the plate A and the end face of shaft D. Shaft B is forced to the left by means of the spring G acting through a sleeve reference letter "W" and thrust balls reference letter "Y" in contact with the plate A, so that the plate A and shaft B are forced against the balls Q, which rest in turn on a member K (herein referred to as the pick-off setting member), and force member K against the clutch plates L, which thereby clutch the member K to the supporting bracket or fixture H. In this normal position it is intended that there shall be a very small clearance at the balls F, which thus fit loosely in the pockets in the shaft D and the plate A.

The pick-off setting member K carries a pin P which is gripped between the jaws provided on the plates I, J, by virtue of the fact that these plates are pulled towards each other by the spring O. These jaws also grip a pin N protruding from the plate A. The result is that the pin P is spring-centralised by the spring O into a centralised position with respect to the plate A, this centralised position being defined by the pin N.

Suppose that the control surface is moved by a movement originating in the servo-motor so that the shaft D rotates. A certain amount of friction will be developed by the balls F acting on the plate A. The adjustments are such that this friction shall be sufficient to overcome the friction in the control column, but not sufficient to cause the balls F to run up the inclined plane formed by the bottom of the wedge-shaped pockets in the plate A and thus to force the plate A back against the action of the spring G. Consequently the plate A and the control column A' are turned with the shaft D and take with them the pin N. On the other hand, the plate K remains clutched to the bracket H and therefore fixed, so that the movement of the pin N merely results in stretching the spring O without transmitting movement to the plate K. The plate K is a pick-off setting member by virtue of the fact that it is connected to actuate the pick-off by the aforesaid tie 13 as seen in Figure 4 or by the cable 19 (Figure 2). It follows therefore that the pick-off is not actuated by movements of the control surface if these originate from the servo-motor or from the control surface, i. e. there is no "drive-back."

If, on the other hand, the control column A' is manually actuated, then the movement of the shaft B is not transmitted to the shaft D through the balls F because the resistance of the servo-motor to movement is of a much higher order than the frictional resistance of shaft B brought into play in the case discussed in the preceding paragraph, and is, in fact, so great that the shaft D is not rotated by the friction of the balls F. Instead, the pockets in which the balls F are carried move over the balls F, and the consequent wedge action, or inclined-plane action, results in the member A being forced to the right against the action of the spring G. This takes pressure off the balls Q and therefore off the clutch L, with the result that the member K is released and follows the movements of the plate A under the action of the centralising spring O. Thus the pick-off is actuated by movements of the control surface but only if these originate in the control column. Movements of the control column A' in excess of the initial movement required to bring about the release of the member K from clutching engagement with the fixture H are transmitted to the shaft D through the pressure of pin C against one or the other side of slot T in shaft B, this slot being of adequate circumferential length to permit full freedom of motion to spring O.

The invention is mainly applicable to control of the aircraft in pitch as it is unlikely that a pilot will wish to set a bank to be maintained automatically unless he wishes to produce automatically a continuous banked turn. The invention can, however, be employed for this latter purpose if actuation of the manual controller to produce a bank is associated with means for automatically setting a corresponding turn at a constant rate; such interlinking of controls for automatically producing banked turns is well known.

Figure 5:
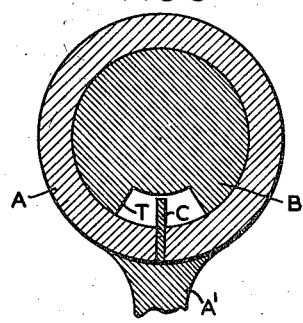
Figure 5 shows a sectional view taken in plane V—V of Figure 3.

Referring to Figures 3–5, it will be appreciated that there is or may be a certain amount of lost motion when moving the manual control element A' before any resistance is experienced in taking up the drive to the control surface 9. If a sufficient degree of lost motion is provided the initial movement of the control column will cause a certain amount of pick-off movement prior to actuating the control surface, and the difference of air pressure provided by the pick-off will actuate the relay valve and set the servo-motor moving. This movement is in the same sense as the initial movement of the control column, so that further movement of the control column is rendered possible. Not only is movement of the control column to cause actuation of the control surface rendered possible by this method, but in fact the power for producing the movement is applied by the servo-motor, so that the system operates to provide servo-aid. Servo-aid is obtained in this way even in systems such as that of Figure 2 in which the servo-motor normally locks the control surface against movements originating from the control surface. Methods of obtaining servo-aid by actuating a servo-motor from initial movement of the manual control are already known. The system according to the present invention is novel over such previous servo-aid arrangements in that the initial movement of the manual control operates through the relay device that actuates the valve controlling the servo-aid is obtained by displacing the pick-off.

In the system of Figure 1, in connection with this question of rendering servo-aid to the manual control it is possible by exerting forces on the manual controller to displace the piston rod of the servo-motor a short distance away from the positions indicated for them by the control system as the servo-motor in this instance is capable of yielding to such an effort. Consequently, the link 13 or 19 between the manual controller and the pick-off will cause the pick-off to be moved and thus bring about servo-aid in accordance with the principles of the invention even if there is no considerable lost motion between the manual controller and the control surface.

Although the description of embodiments of the invention has been confined to air pick-off systems, it is to be understood that the invention is equally applicable to other pick-off systems. For instance, electrically operated pick-offs may be placed under the control of the manual mechanism in the same way. There can be taken as a simple example a potentiometer type of pick-off wherein the arm of a potentiometer actuated by the gyroscope is connected to one terminal of a battery or other source of current, and the extremities of the potentiometer winding connected to the respective windings of the rotor of a torque motor having two windings commoned to the other terminal of the battery. With this kind of electric pick-off and electrical relay device responsive thereto when the potentiometer arm is at the centre point of the potentiometer winding equal currents flow through the two windings of the rotor. These windings are equal and opposite, so that the rotor of the torque motor is normally not energised. An arm attached to it is held in a central position by centralising springs and this central position corresponds with the axis of the magnetic field of the stator of the torque motor. If the potentiometer arm is displaced on the potentiometer winding, the currents in the two windings of the rotor become unbalanced, with the result that a resultant field is produced and the rotor tends to turn against the action of the centralising springs in one direction or the other in order to line up with the axis of the field of the stator of the torque motor. The angle through which the rotor turns is limited by the centralising springs and is proportional to the angle through which the potentiometer arm turns relatively to the potentiometer winding. The arm attached to the rotor operates a relay valve such as 6 in the previous example and this in turn controls the servo. It follows that the displacement imparted to the relay valve is proportional to the angle through which the potentiometer arm turns relative to the potentiometer winding. The potentiometer winding is carried on a member adjustable about the axis of rotation of the potentiometer arm. The member carrying the potentiometer winding constitutes the pick-off member for the gyroscope and, according to the invention, could be geared with a pinion such as 14 in Figure 1 so as to be operated by the manual control.

I claim:

1. In a dual control system, a conrollable member, means for manually and separate means for automatically controlling said controllable member, interlocking clutch means interposed between said manual control means and said controllable member comprising a first shaft rotatable by said manual control means, a second shaft coaxial with the first for operating said controllable member, said second shaft being rotatable by the first shaft through said clutch means, a plate mounted on the first shaft, a pick-off setting member, spring means for urging said plate against said pick-off setting member, and combination friction and wedging means interposed between end surfaces of said first and second shafts, said combination friction and wedging means, said plate and said spring means cooperating in a manner whereby said pick-off setting member is moved by rotation of said plate when pressure on the plate by said spring means is relieved by the operation of said wedging means in response to the rotation of said first shaft, said spring means maintaining pressure on said plate when said second shaft is rotated to thereby transmit movement back to said first shaft without changing the position of the pick-off setting member.

2. In a combined automatic and servo-aid control system, a deflectable member, power actuated means operatively connected to said member, a pick-off operable to control said power actuated means having two relatively movable parts, a manually operable controller for said deflectable member, means effective to interlock said power actuated means and said manual controller in response to initial movement of said manual controller, and means rendered effective by said interlocking means for operatively connecting said manual controller and one of the parts of said pick-off.

3. A system for guiding aircraft comprising a control surface, a servomotor, means for automatically controlling said servomotor from an instrument maintaining a fixed reference including a two-part pick-off, a manual controller, and clutching means for interconnecting said control surface, said manual controller, and one of the parts of said pick-off, movement being normally imparted to said control surface by said servomotor for maintenance of a fixed craft attitude relative to said fixed reference, movement of said manual controller operating through said clutching means to displace one of the parts of said pick-off and actuate said servomotor to move said control surface in the direction said control surface would normally be moved by said manual controller operating independently of said servomotor, said means for automatically controlling said servomotor thereafter automatically maintaining the craft in an attitude corresponding with the displaced setting of said pick-off.

4. A combined control system for dirigible craft, comprising a control surface, a manually-controlled power-actuated controller for positioning said surface including a manual controller, a servomotor, fully automatic means for controlling said servomotor to maintain the attitude of said craft fixed relative to a fixed directional line including a pick-off member, and a clutch having an output element connected to said control surface, a normal input element connected to said manual controller, a pick-off setting element connected to said pick-off member including spring actuated friction plates disengaging to allow said pick-off member to be displaced by movement of said manual controller and engaging to prevent drive-back from said control surface to said pick-off member.

5. A servomotor comprising a pair of fluid pressure chambers, fluid supplying means for said chambers, means for differentially varying the amount of fluid supplied the respective chambers by said supply means, a piston for each chamber, means connecting said pistons, and means for continuously discharging fluid from each of said chambers including a port in each of the pistons and a tapered finger fixed in position in the respective fluid chambers to project through each port, said ports being arranged to move with respect to the fingers to increase the area of the opening defined by the discharge port in one chamber and to decrease the area of the opening defined by the discharge port in the other chamber with operation of the servomotor.

6. In a combined automatic and servo-aid control system, a deflectable member, power actuated means operatively connected to said member, a pick-off operable to control said power actuated means having two parts, a differential having two inputs and an output operatively connected to one of the parts of said pick-off, a manually operable controller for said deflectable member, means effective to interlock said power actuated and said manual controller in response to initial movement of said manual controller, means rendered effective by said interlocking means for operatively connecting said manual controller and one of the inputs of the differential, and means connecting the power actuated means and the other input part of the differential.

BEVAN GRAHAM HORSTMANN.